July 11, 1944.  G. A. LYON  2,353,575
WHEEL STRUCTURE
Original Filed Jan. 21, 1941
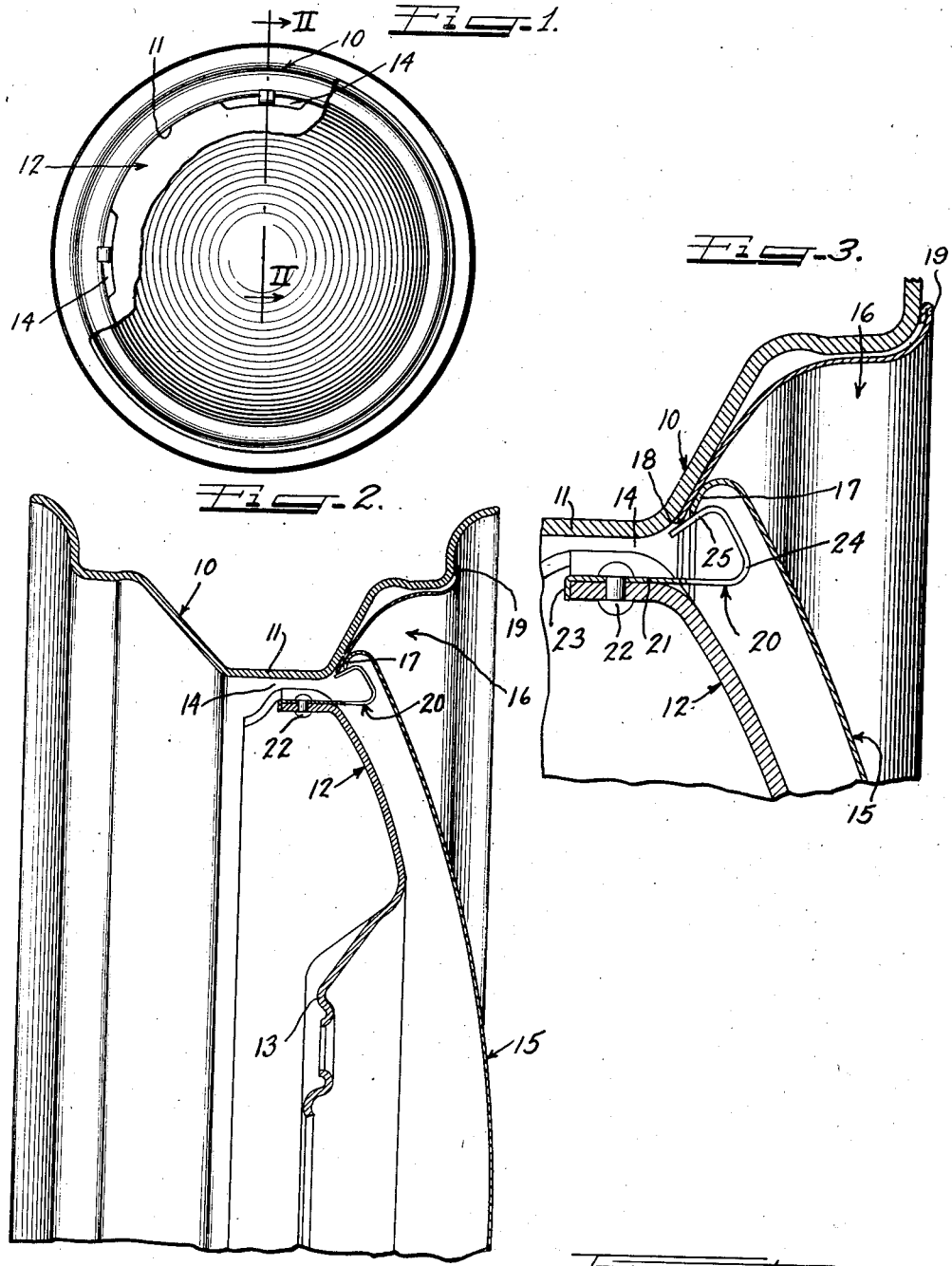
Inventor
GEORGE ALBERT LYON.

Patented July 11, 1944

2,353,575

UNITED STATES PATENT OFFICE 2,353,575

WHEEL STRUCTURE

George Albert Lyon, Allenhurst, N. J.

Original application January 21, 1941, Serial No. 375,171. Divided and this application January 12, 1942, Serial No. 426,451

2 Claims. (Cl. 301—37)

This invention relates to a wheel structure, and more particularly to the provision therein of novel cover retaining means.

The subject matter of the present application has been divided from my copending application Serial No. 375,171, filed January 21, 1941, entitled "Wheel structure."

An object of this invention is to provide in a wheel structure a more simplified and compact arrangement for retaining cover and trim members on a wheel.

Another object of the invention is to provide cover retaining means which may be disposed compactly within the confines of the wheel body, and more particularly within a plurality of openings in the wheel body between the wheel body and the tire rim at the junction of these two parts of the wheel.

In accordance with the general features of this invention, there is provided in a wheel structure a wheel including tire rim and body parts joined together at spaced intervals with spaced openings between the joints and with a plurality of cover retaining spring clips in the openings and secured to one of the wheel parts; the spring clips extending outwardly beyond the openings and each having a yieldable portion for engaging the wheel and retaining on the wheel a wheel cover or trim member.

In accordance with other features of the invention, the cover retaining spring clips are each provided with a radially and outwardly inclined end portion for yieldably engaging an inner edge of the cover member.

Other objects and features of this invention will more fully appear from the following detailed description taken in connection with the accompanying drawing which illustrates several embodiments thereof, and in which:

Figure 1 is a side view of a wheel structure embodying this invention and showing the cover partly broken away to illustrate the positions of the spring retaining clips;

Figure 2 is a fragmentary enlarged cross sectional view taken substantially on the line II—II of Figure 1 looking in the direction indicated by the arrows; and Figure 3 is an enlarged fragmentary cross sectional view corresponding to the upper right hand portion of Figure 2 and showing more clearly the coaction of the spring clips with both the cover member and the trim ring.

As shown on the drawing:

The reference character 10 designates generally a multi-flanged drop center type of tire rim which includes a base flange 11 fastened at spaced intervals to a convex-concave wheel body part or spider 12 having the usual central bolt-on flange 13 for attachment to a suitable support for the automobile wheel. As will be observed from both Figures 1 and 2, the connections between the rim part 10 and the spider part 12 are spaced by openings 14 in the body part, in which openings are disposed spring clips designated generally by the reference character 20. These spring clips are all identical, and hence a description of one will suffice for all. First, it should be noted that the purpose of these spring clips 20 is to retain a multiple of cover members on the wheel, namely, a central wheel disk 15 and an annular trim ring 16. The central disk 15 has an underturned outer edge or skirt portion 17 adapted to bear against the inner edge 18 of the trim ring 16. Also, if it is desired, the upper edge of the trim ring 16 may be turned as designated at 19 so as to reinforce it at the pry-off area.

As is clearly shown in Figure 3, each of the spring clips 20 is adapted to engage both of edges 17 and 18 of the disk 15 and ring 16. Each clip includes an axially extending body portion 21 extending through an opening 14 and suitably fastened, as by rivets 22, to the body part 12. Each clip has a rear bent end 23 turned radially inward over a rear edge of the body part 12 to prevent turning of the clip. Also, each clip includes a loop-like free end 24 having an axially and radially inclined end portion 25 turned axially back upon the body portion 21 and constructed and arranged to engage yieldably the edges 15 and 16.

In the application of the cover member to the wheel, the trim ring 16 is first pressed over the inclined end portion 25 of the spring clip, which end or edge portion yields as the edge of the trim ring is passed thereover. As a consequence, the edge portions 25 of the loop-like ends 24 of the spring clips apply a resilient or yieldable pressure against the inner edge 18 of the trim ring 16 to hold the same against the rim part 10.

Similarly, the central cover member 15 may thereafter be applied to the clips until the edge 17 of the cover member is in the retained position shown in Figure 3. From Figure 3, it will be perceived that the same inclined portion 25 of each of the clips engages both of the edges 17 and 18 of the two cover members. Moreover, since the spring clips exert a stressed or spring retaining pressure against the edge 17, these clips not only hold the cover member 15 in position but also clamp this cover member against the inner marginal portion of the rim ring 16.

In the above described embodiment of the invention, the spring clip means serves to hold tightly the cover member by means of the resilient pressure against the cooperating part of the wheel and cover. The engagement is a detachable one, in that the cover part may be easily pried loose from the wheel by means of a suitable pry-off tool such as a screw-driver. That is to say, by inserting the free end of the pry-off tool or screw-driver under the outermost edge of the cover member 15 it is easy to pry the cover member free of its retaining engagement by the spring clips, thereby also freeing the ring-shaped cover member 16.

I claim as my invention:

1. In a wheel structure including a flanged tire rim part and a body part connected together at spaced intervals with spaced openings between connections, a plurality of cover retaining spring clips at said openings and each being secured to one of said wheel parts and having a free end extending outwardly beyond the associated opening, each of said openings being defined on one side by an axially rearwardly extending flange on said body part, said flange comprising a supporting base to which a clip is fastened, and a wheel cover for concealing said openings and having an edge snapped over the free ends of said clips and into retaining engagement therewith.

2. In a wheel structure including a flanged tire rim part and a body part connected together at spaced intervals with spaced openings between connections, a plurality of cover retaining spring clips at said openings and each being secured to one of said wheel parts and having a free end extending outwardly beyond the associated opening, each of said openings being defined on one side by an axially rearwardly extending flange on said body part, said flange comprising a supporting base to which a clip is fastened, and a wheel cover for concealing said openings and having an edge snapped over the free ends of said clips and into retaining engagement therewith, the free end of each of said clips being turned back upon itself radially outward of the fastening of the clip and defining an inclined surface opposite a side flange of the rim part and between which side flange and inclined surface the edge of the cover is adapted to be clampingly retained.

GEORGE ALBERT LYON.